(12) United States Patent
Shahid

(10) Patent No.: US 6,222,976 B1
(45) Date of Patent: Apr. 24, 2001

(54) OPTICAL HARNESS AND CROSS-CONNECT METHOD

(75) Inventor: Muhammed Afzal Shahid, Snellville, GA (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/343,967

(22) Filed: Jun. 30, 1999

(51) Int. Cl.$^7$ .................................................. G02B 6/00
(52) U.S. Cl. ........................ 385/134; 385/114; 385/136; 385/137
(58) Field of Search ................................. 385/114, 115, 385/134, 135, 136, 137, 147

(56) References Cited

U.S. PATENT DOCUMENTS

| | | | |
|---|---|---|---|
| 5,134,673 | * 7/1992 | Stephenson et al. | 385/56 |
| 5,155,785 | * 10/1992 | Holland et al. | 385/89 |
| 5,222,179 | * 6/1993 | Auteri | 385/114 |
| 5,239,609 | * 8/1993 | Auteri | 385/136 |
| 5,367,595 | * 11/1994 | Jennings et al. | 385/71 |
| 5,381,501 | * 1/1995 | Cardinal et al. | 385/54 |
| 5,394,502 | * 2/1995 | Caron | 385/134 |
| 5,734,777 | * 3/1998 | Merriken et al. | 385/135 |
| 5,926,598 | * 7/1999 | Klein | 385/137 |
| 6,034,821 | * 3/2000 | Schenfeld et al. | 385/137 X |
| 6,148,134 | * 11/2000 | Schoon | 385/137 |

* cited by examiner

Primary Examiner—Brian Healy
(74) Attorney, Agent, or Firm—Thomas, Kayden, Horstemeyer & Risley, LLP

(57) ABSTRACT

The present invention is an optical harness and method for an optical cross-connect. The optical harness is defined primarily by a first portion and a second portion. The first portion of the optical harness comprises a number M of fiber optic row cables where each fiber optic row cable comprises an array of a number N of fiber optics arranged on a first plane. The first plane on which each fiber optic row cable is disposed is substantially parallel to each of the other first planes on which a fiber optic row cable is disposed. The second portion of the optical harness comprises a number N of fiber optic column cables where each fiber optic column cable comprises an array of a number M of fiber optics arranged on a second plane. Each fiber optic column cable is disposed on a second plane being substantially parallel to each of the other second planes on which each other fiber optic column cable is disposed. The optical harness further comprises a holding mechanism disposed intermediate the first portion and the second portion of the optical harness. The orientation of the first planes on which the fiber optic row cables are disposed is arranged at a defined angle relative to the second plane on which the fiber optic column cables are disposed.

27 Claims, 2 Drawing Sheets

OPTICAL HARNESS AND CROSS-CONNECT METHOD

BACKGROUND OF THE INVENTION

Advances in light wave technology have made optical fibers a very popular medium for large bandwidth communication applications. In particular, optical technology is being utilized more and more in broadband systems wherein communications between systems take place on high-speed optical channels. As this trend continues to gain more and more momentum, the need for efficient utilization of the precious real estate on circuit boards, racks/shelves, back planes, distribution cabinets, etc., is becoming ever increasingly important. In order to fulfill expectations across the industry, opto-electronic modules and optic fiber devices need to continue to be made miniaturized or compact, thereby taking full advantage of the maturity of micro- and opto-electronic technologies for generating, transporting, managing and delivering broadband services to ever increasing bandwidth demands of end users at increasingly lower costs. Thus, the industry has placed an emphasis on small optical connectors and optical harnesses, both simple and complex. However, miniaturizing and compacting is tempered by the requirements of transmission efficiency and organization.

With the miniaturization of optical modules and optical fiber devices, the management of optical fiber congestion has become an issue at optical interfaces and connection distribution points. One solution is the use of multi-fiber ribbon in which a plurality of optical fibers are organized and contained side by side in a plastic ribbon. It is known to interconnect these ribbon cables by supporting the fibers between two support members made of a monocrystaline material, such as silicon. In the support members are V-grooves formed utilizing photolithographic masking and etching techniques. The fibers are placed side by side in individual V-grooves of one support member and the other mating support member having corresponding V-grooves is placed over the fibers so as to bind or hold the fibers in a high precision spatial relationship between the mating V-grooves. The top and bottom support members sandwiching the multi-fiber ribbon are typically bonded together with a clamp or adhesive, forming a plug of a multi-fiber connector. Two mating plugs with the same fiber spacing may then be placed in an abutting relationship so that the ends of the fibers of the respective plugs are substantially co-axially aligned with one another, thereby forming a multi-fiber connection. If desired, such plugs can be stacked in order to increase the interconnection density. However, in addition to straight connections, in some applications it is desirable to re-route the optical fibers in a multi-fiber ribbon and reconfigure the optical fibers in a new multi-fiber ribbon combination.

Multi-fiber ribbons and connectors have numerous applications in optic communication systems. For instance, optical switches, optical power splitters/combiners, routers, etc., have several input and/or output ports arranged as linear arrays to which a plurality of fibers are to be coupled. Further, since optical fibers are attached somehow to launch optical signals into these devices and extract optical signals therefrom, splicing of arrays of fibers (i.e., a multi-fiber ribbon) to such devices can be achieved using multi-fiber connectors. Another possible application relates to an optical fan-out fabric where an array of fibers in a multi-fiber ribbon may be broken into simplex or duplex channels for distribution purposes, as is often desired.

Another multiple fiber application is the perfect shuffle cross-connect, where, for example, each of the multiple input ports, typically comprising more than one optical fiber, is in communication by one fiber with each of the multiple output ports, which also typically comprises more than one optical fiber. The perfect shuffle cross-connect provides for multi-channel optical transmissions, for example as in multi-wavelength transmissions, to be mixed in an orderly fashion. Currently, such connections are made by flexible optical circuits or complex jumpers. While complex jumpers take up space and create congestion, the flexible optical circuit is expensive to produce, often requiring highly skilled labor, such as a CAD designer to generate the original drawings of the circuit, and expensive processing machines such as those for fiber routing, lamination and connectorization equipment.

In summary, there continues to be strong market forces driving the development of fiber optic connection systems that take up less space and relieve congestion, while at the same time demanding that the increasing interconnection density requirements be satisfied. Further, such a connection system should be capable of being manufactured and assembled easily and inexpensively.

Thus, a heretofore unaddressed need exists in the industry to address the aforementioned deficiencies and inadequacies.

SUMMARY OF THE INVENTION

The present invention is an optical harness for an optical cross-connect defined primarily by a first portion and a second portion. The first portion of the optical harness comprises a number M of fiber optic row cables where each fiber optic row cable comprises an array of a number N of fibers arranged on a first plane. The first plane on which each fiber optic row cable is disposed is substantially parallel to each other first plane on which a fiber optic row cable is disposed. The second portion of the optical harness comprises a number N of fiber optic column cables where each fiber optic column cable comprises an array of a number M of fibers arranged on a second plane angularly disposed relative to the first plane. The second plane on which each fiber optic column cable is disposed is substantially parallel to each other second plane on which a fiber optic column cable is disposed. The optical harness further comprises a holding mechanism disposed intermediate the first portion and the second portion of the optical harness. The orientation of the first planes on which the fiber optic row cables are disposed is arranged at a defined angle relative to the second planes on which the fiber optic column cables are disposed. The holding mechanism is arranged and configured to transition the fibers from one configuration toward the first portion to the other configuration toward the second portion and to maintain the relative angled arrangement.

The present invention can also be viewed as a method for providing an optical cross-connect between a first element and a second element between which distribution or re-routing accurately positioned optical fibers in predetermined configuration is desired. In this regard, the method can be broadly summarized by the following steps: providing a number M of fiber optic row cables having a defined length, where each fiber optic row cable comprises an array of a number N of fibers arranged on a first plane substantially parallel to the first plane of each of the other fiber optic row cables; stacking the number M of fiber optic row cables; disposing a holding mechanism intermediate the defined length of the fiber optic row cables; separating each array of N fibers into individual fibers; re-grouping the fiber optics into a number N of fiber optic column cables, each comprising a number M of fibers; connecting the first portion of the cross-connect to the first element; and connecting the second portion of the cross-connect to the second element. Thus a transition from a plurality, such as twelve, rows of, for example, ten fibers each, to an array of ten columns of twelve fibers each is realized. Each column contains only the fibers which have common positions in the rows. Thus all number one fibers are in one column, number two fibers in a second column, etc. This makes possible a perfect shuffle cross-connect in a minimum of space and complexity.

Other features and advantages of the present invention will become apparent to one with skill in the art upon examination of the following drawings and detailed description. It is intended that all such additional features and advantages be included herein within the scope of the present invention.

BRIEF DESCRIPTION OF THE SEVERAL VIEWS OF THE DRAWINGS

The invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION OF THE INVENTION

Figure 1:
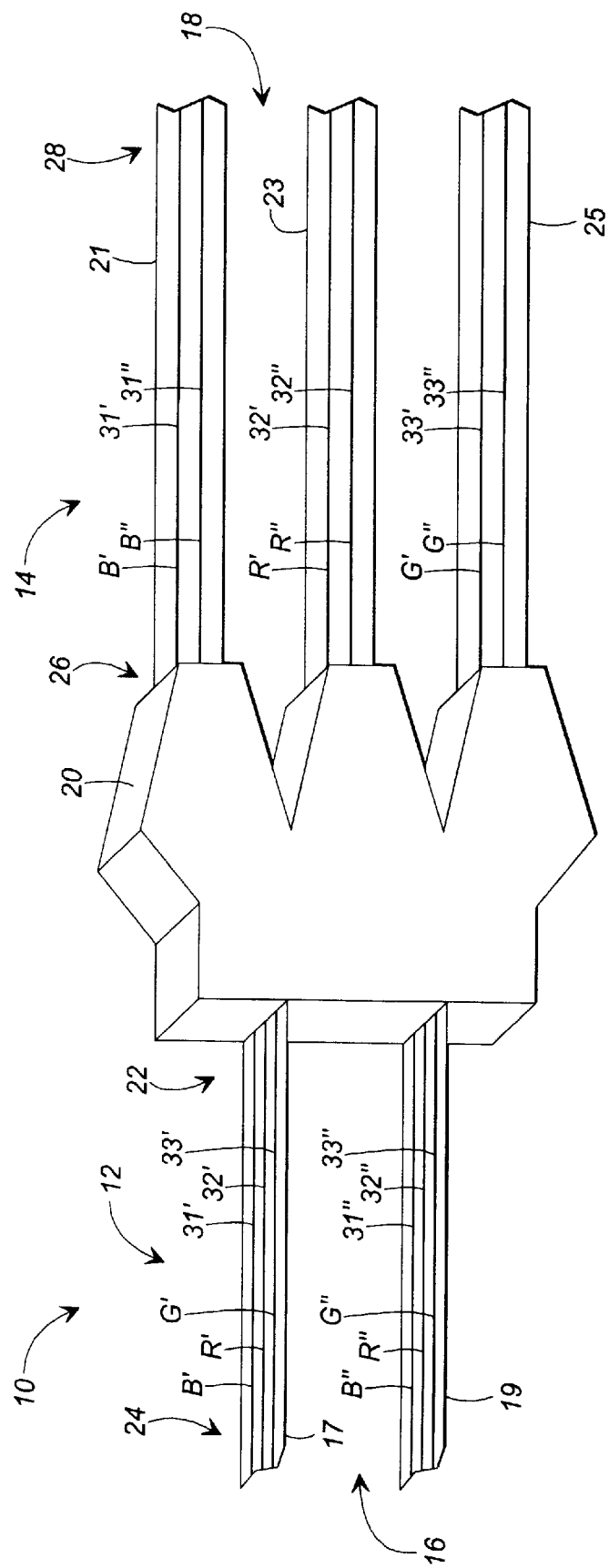
FIG. 1 illustrates a perspective view of the present invention.
Figure 2:
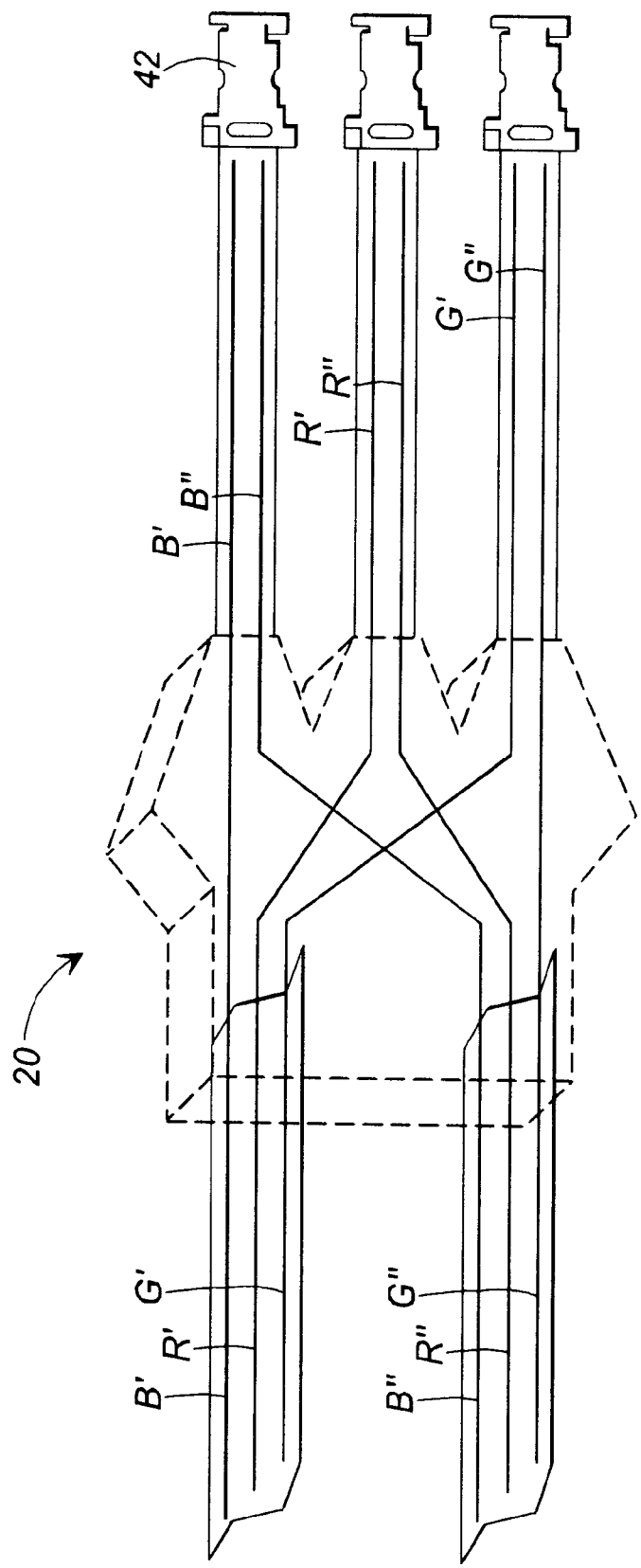
FIG. 2 illustrates a perspective view showing a cut-away view of the holding mechanism of the optical harness of FIG. 1.

While the invention is susceptible to various modifications and alternative forms, a specific embodiment thereof is shown by way of example in the drawings and will herein be described in detail. It should be understood, however, that there is no intent to limit the invention to the particular form disclosed, but on the contrary, the invention is to cover all modification, equivalents, and alternatives falling within the spirit and scope of the invention as defined by the claims.

FIG. 1 illustrates a preferred embodiment of an optical harness of the present invention, referred to generally as reference numeral 10. The optical harness 10 of the present invention provides an optical cross-connect capable of receiving multiple wavelengths and separating or mixing the wavelengths with accurately positioned optical fibers in a pre-designed configuration. Broadly, the optical harness 10 transitions rows of a plurality of fibers 17, 19, disposed toward a first portion 12 of the optical harness 10, to a plurality of columns of fibers 21, 23, 25, disposed toward a second portion 14 of the harness 10, where the fibers have common positions in the rows.

For receiving and re-routing M number of wavelengths, generally, the present invention embodies an optical harness 10 having a number M of fiber optic row cables 16 disposed toward a first portion 12 of an optical harness 10 and a number N of fiber optic column cables 18 disposed toward a second portion 14 of an optical harness 10. Each of the M number of fiber optic row cables 16 comprises an array comprising a number N of fiber optics arranged on a first plane that is substantially parallel to the first plane of each of the other M number of fiber optic row cables 16. It is preferable that each of the fiber optic row cables 16 is ribbonized, such as the type taught in U.S. Pat. No. 4,900,126, the disclosure of which is herein incorporated by reference. Each of the N number of fiber optics is separated from its ribbonized configuration, re-routed, and configured such that each of the number N of fiber optic column cables 18 comprises an array of a number M of fibers. Each of the number M of fibers are arranged on a second plane substantially parallel to the second planes on which each of the other number N of fiber optic column cables 18 are arranged. To re-rout the multiple wavelengths in a predetermined accurate configuration, or provide a perfect shuffle optical cross-connect, each fiber optic in the array of the N number of fiber optics comprising each fiber optic row cable is re-routed to a different cable of the N number of fiber optic column cables. A holding and routing mechanism 20 is disposed intermediate first portion 12 and second portion 14 of the optical harness 10 and arranged and configured to maintain the fiber optic row cables 16 in the preferred first plane orientation and the fiber optic column cables 18 in the preferred second plane orientation. The fiber optics of the fiber optic column cables 18 can then be re-ribbonized in their new configuration. To provide a perfect shuffle cross-connect the fiber optics are re-routed in an organized manner. For example, the optical fibers in a first position in each of the fiber optic row cables 16 can be re-routed to a first fiber optic column cable 18 and arranged "in order" such that the fiber re-routed from the first position fiber optic row cable is positioned as the first position fiber optic in the first position fiber optic column cable and the fiber optic re-routed from the second position fiber optic row cable is positioned as the second position fiber optic in the first position fiber optic column cable, and so on. To assist in ensuring such organization, the fibers can be coded, or marked, such as with color or by any other suitable means, to indicate their location in each fiber optic row cable (the fiber optic's position in an array). The fibers can be further marked to indicate from which fiber optic row cable the fiber optic originated.

More specifically, FIG. 1 illustrates a preferred embodiment of an optical harness 10 of the present invention. The optical harness 10 includes a first portion 12 and a second portion 14. Looking first at the first portion 12, the first position fiber optic row cable 17 comprises an array of fibers disposed in a first position fiber 31', preferably colored and marked, a second position fiber 32', preferably colored and marked, such as red R', and a third position fiber 33', preferably colored and marked, such as green G', arranged on a first plane. Similarly, the second position fiber optic row cable 19 comprises a first position fiber 31", preferably colored and marked, such as blue B", a second position fiber 32", preferably colored and marked, such as red R", and a third position fiber 33", preferably colored and marked G", arranged preferably on a first plane. Although two fiber optic row cables comprising three fibers each are illustrated, it should be understood that the present invention can include any number of fiber optic row cables each comprising any number of fibers. The first position fiber optic row cable 17 and second position fiber optic row cable 19 are preferably ribbonized and collected by a holding mechanism 20. It is preferable that the first plane of the first fiber optic row cable 17 and the first plane of the second fiber optic row cable 19 are substantially parallel to each other. In this stacked configuration, the fibers are arranged in columns of like colors. The fiber optics comprising the fiber optic row cables are separated from their respective originating fiber optic row cables 17, 19, and re-grouped and preferably re-ribbonized, into columns of like colors. The columns of like colors comprise the fiber optic column cables disposed toward the second portion 14 of the optical harness 10. The holding mechanism 20 holds the stack of fiber optic row cables in position and prevents the point of separation of the fibers out of the fiber optic row cable configuration from traveling further along the fiber optic row cables. The re-configured fiber optics extend from the holding mechanism 20 grouped in a first position fiber optic column cable 21, a second position fiber optic column cable 23 and a third position fiber optic column cable 25. The first position fiber optic column cable 21 preferably comprises the first position fiber optic 31', preferably colored and marked, such as in blue B', (from the first position fiber optic row cable 17) and the first position fiber optic 31", preferably colored and marked, such as in blue B", (from the second position fiber optic row cable 19), arranged on a second plane. Similarly, the second position fiber optic column cable 23 comprises the second position fiber optic 32', preferably colored and marked, such as in red R', (from the first position fiber optic row cable 17) and the second position fiber optic 32", preferably colored and marked, such as in red R", (from the second position fiber optic row cable 19), arranged on a second plane. Finally, the third position fiber optic column cable 25 comprises the third position fiber optic 33', preferably colored and marked, such as in green G', (from the first position fiber optic row cable 17) and the third position fiber optic 33", preferably colored and marked, such as in green G", (from the second position fiber optic row cable 19), arranged on a second plane.

It should be noted that the first position for each of the fiber optic column cables, the first position optic fiber 31', 32' and 33', marked B', R' and G' respectively, originate from the first position fiber optic row cable 17. Similarly, the second position fiber optics 31", 32" and 33", marked B", R", and G", respectively, are in the second position of each of the fiber optic column cables. As such, each fiber optic row cable 17, 19 is in communication with each fiber optic column cable 21, 23, 25 by one fiber optic. This method of reconfiguration provides for the perfect shuffle cross-connect. As discussed previously, marking each fiber optic to indicate its location at the first portion 12 of the optical harness 10 can assist in such an organized re-routing.

Each of the fiber optic row cables 17, 19 are preferably arranged and held by the holding mechanism 20 on a first plane, each first plane being substantially parallel to the others. Likewise, each of the fiber optic column cables 21, 23, 25 are preferably arranged and held by the holding mechanism 20 on a second plane, each second plane being substantially parallel to the others. The first planes on which the fiber optic row cables are arranged are preferably oriented at a defined angle relative to the second planes on which the fiber optic column cables are arranged. The defined angle can be substantially ninety degrees. To provide a perfect shuffle cross-connect communication, opposing free ends of the fiber optic row cables and fiber optic column cables, respectively, can further include connectors 42, such as an optical array connector taught in U.S. Pat. No. 5,214,730, the disclosure of which is herein incorporated by reference, suitable for communicating with other elements between which the perfect shuffle cross-connection is desired.

In a preferred method of assembly, M number of fiber optic row cables are provided. Each of the fiber optic row cables can be connectorized at only one end. Each of the fiber optic row cables comprises an array of N number of fiber optics, preferably each of the N number of fiber optics is marked with a different color, or other suitable marking, and arranged in the same order within each of the cables. The cables are stacked one on top of each other such that corresponding colors (or other marking) of fibers are disposed on top of each other in a column and that all of the connectorized ends are on the same side of the stack. For the sake of uniformity, the M number of fiber optic row cables can be cut from the same reel of ribbon cable. The stack of fiber optic row cables can be secured in this configuration preferably intermediate the connectorized ends and the non-connectorized ends. The non-connectorized end is preferably cut at an oblique angle such that the fibers at one end and marked of a like color or other marking, such as the blue marked fibers B, are longer than the fibers disposed beside them, such as the red marked fibers R, in the fiber optic row cable configuration. The columns of like colored fibers can then be separated from their original respective row configurations and re-ribbonized into like marked fiber optic column cables. To facilitate separation of the fibers from the ribbonized row configurations, the harness 10 can be turned such that the columns of like colored fibers are flush with a flat surface, such as a table top. Secondary markings on the fibers can help when re-grouping to keep the fibers in proper order.

Although an optical harness and optical cross-connect providing a perfect shuffle is disclosed herein in detail, one with ordinary skill in the art will appreciate that the present disclosure can include other specific optical cross-connects. It should further be noted that while in some optical cross-connects the number N and number M may differ; in several other cases the number N and number M may be the same. It is intended that all such variations are within the spirit of the present invention.

Many variations and modifications may be made to the above-described embodiment(s) of the invention without departing substantially from the spirit and principles of the invention. All such modifications and variations are intended to be included herein within the scope of the present invention.

Therefore, having thus discussed the invention, at least the following is claimed:

1. An optical harness having a first portion and a second portion, said optical harness comprising:
   a number M of fiber optic row cables, each of said fiber optic row cables comprising an array of a number N of fibers arranged on a first plane, said fiber optic row cables being disposed toward said first portion of said optical harness, said first plane of each fiber optic row cable being substantially parallel to each other first plane;
   a number N of fiber optic column cables, each of said fiber optic column cables comprising an array of a number M of fiber optics arranged on a second plane, said fiber optic column cables being disposed toward said second portion of said optical harness, said second plane of each fiber optic column cable being substantially parallel to each other second plane; and
   a holding mechanism disposed intermediate said first portion and said second portion of said optical harness;
   wherein said first plane is oriented at a defined angle relative to said second plane and said holding mechanism is arranged and configured to transition said fiber optics from said first portion to said second portion and to maintain said orientation.

2. The optical harness of claim 1, wherein said N number of fiber optics comprising each of said M number of fiber optic row cables is reconfigured to provide an optical cross-connect.

3. The optical harness of claim 2, wherein said optical cross-connect comprises a perfect shuffle.

4. The optical harness of claim 1, wherein each of said N number of fiber optics in each of said fiber optic row cables is re-routed to a different of said N number of fiber optic column cables.

5. The optical harness of claim 1, further comprising:
   a number M of connectors disposed at said first portion of said optical harness, wherein each of said fiber optic row cables supports one connector;
   a number N of connectors disposed at said second portion of said optical harness, wherein each of said fiber optic column cables supports one connector; and
   wherein each of said M number of connectors is in communication with each of said N number of connectors by one fiber optic.

6. The optical harness of claim 1, wherein the number M is equal to the number N.

7. The optical harness of claim 1, wherein the number M is different from the number N.

8. The optical harness of claim 1, wherein each of said fiber optic column cables is ribbonized.

9. The optical harness of claim 1, wherein each of said fiber optic row cables is ribbonized.

10. The optical harness of claim 1, wherein each of said fiber optics is primarily coded to indicate the position in which each optical fiber is disposed within each of said optical fiber row cables.

11. The optical harness of claim 10, wherein each of said fiber optics is secondarily coded to indicate in which optical fiber row cable each fiber optic is arranged.

12. The optical harness of claim 1, wherein said defined angle comprises substantially ninety degrees.

13. A method for assembling an optical harness having a first portion and a second portion, said method comprising the steps of:

providing a number M of fiber optic row cables, each of said fiber optic row cables comprising a number N of fiber optics, said fiber optic row cables being disposed toward said first portion of said optical harness;

providing a number N of fiber optic column cables, each of said fiber optic column cables comprising a number M of fiber optics, said fiber optic column cables being disposed toward said second portion of said optical harness; and disposing a holding mechanism intermediate said first portion and said second portion of said optical harness, wherein said holding mechanism is arranged and configured to transition said fiber optics from said first portion to said second portion and to maintain said orientation;

orienting said fiber optic column cables at a defined angle relative to said fiber optic row cables.

14. The method of claim 13, wherein said N number of fiber optics comprising each of said M number of fiber optic row cables is reconfigured to provide an optical cross-connect.

15. The method of claim 14, wherein said optical cross-connect comprises a perfect shuffle.

16. The method of claim 13, wherein each of said N number of fiber optics in each of said fiber optic row cables is re-routed to a different of said N number of fiber optic column cables.

17. The method of claim 13, wherein said fiber optic row cables have a fixed end and a free end and said fiber optic column cables have a fixed end and a free end, said method further comprising the steps of:

fixing M number of connectors to said free end of said fiber optic row cables, wherein one connector is fixed to said free end of each of said M number of said fiber optic row cables; and fixing N number of connectors to said free end of said fiber optic column cables, wherein one connector is fixed to said free end of each of said N number of fiber optic column cables;

wherein each of said M number of connectors is in communication with each of said N number of connectors by one fiber optic.

18. The method of claim 13, wherein the number M is equal to the number N.

19. The method of claim 13, wherein the number M is different from the number N.

20. The method of claim 13, further comprising the step of:

primarily marking each of said fiber optics to indicate the position in which each optical fiber is disposed within each of said optical fiber row cables.

21. The method of claim 20, further comprising the step of:

secondarily marking each of said fiber optics to indicate in which fiber optic row cable each fiber optic is arranged.

22. The method of claim 13, wherein said defined angle comprises substantially ninety degrees.

23. A method for cross-connecting between a first element and a second element, said method comprising the steps of:

providing a number M of fiber optic row cables having a first end and a second end, each of said fiber optic row cables having a number N of fiber optics arranged on a first plane;

connectorizing said first end of each of said number M of fiber optic row cables;

stacking said number M of fiber optic row cables such that said connectorized ends of said fiber optic row cables are grouped together;

fixing said stack of fiber optic row cables together;

separating said number N of fiber optics in each of said number M of fiber optic row cables;

grouping said number N of fiber optics into number N of fiber optic column cables each comprising number M of fiber optics, said fiber optic column cables being arranged on a second plane, wherein said second plane is arranged at a predetermined angle with respect to said first plane;

connectorizing said second end;

connecting said first end to said first element; and connecting said second end to said second element.

24. The method of claim 23, wherein said defined angle is substantially ninety degrees.

25. The method of claim 23, wherein said cross-connecting comprises a perfect shuffle.

26. An optical harness comprising a number M of optical ribbon cables that extend longitudinally between first and second ends of the harness, each of said ribbon cables comprising a number N of optical fibers that are held together as a unit in a planar array

CHARACTERIZED BY a number M of optical array connectors disposed at the first end of the optical harness, wherein each of the optical ribbon cables terminates in one of said M number of array connectors; and a number N of optical array connectors disposed at the second end of the optical harness, wherein one optical fiber from each of the ribbon cables terminates in one of said N number of array connectors.

27. The optical harness of claim 26, wherein the interconnection of optical fibers between the connectors at the first and second ends of the harness comprises a perfect shuffle.

* * * * *